(12) United States Patent
Hope et al.

(10) Patent No.: US 6,318,400 B1
(45) Date of Patent: Nov. 20, 2001

(54) LOW INTERFLOW HYDRAULIC SHUTTLE VALVE

(75) Inventors: Rodney C. Hope, Sugar Land; Richard R. Watson, Missouri City; F. Harold Hollister, Richmond, all of TX (US)

(73) Assignee: Gilmore Valve Company, Houston, TX (US)

( * ) Notice: Subject to any disclaimer, the term of this patent is extended or adjusted under 35 U.S.C. 154(b) by 0 days.

(21) Appl. No.: 09/452,594

(22) Filed: Dec. 1, 1999

(51) Int. Cl.[7] .......................... F16K 31/12; F16K 11/07; G05D 11/03
(52) U.S. Cl. .................. 137/112; 137/113; 137/111; 251/332; 251/333
(58) Field of Search .................. 137/111, 112, 137/113; 251/332, 333

(56) References Cited

U.S. PATENT DOCUMENTS

| | | |
|---|---|---|
| 776,061 | 11/1904 | Hewett . |
| 1,529,384 | 3/1925 | Adams . |
| 1,686,310 | 10/1928 | Beebe . |
| 1,754,975 | 4/1930 | Andersen . |
| 1,795,386 | 3/1931 | Beebe . |
| 2,197,455 | 4/1940 | Volpin . |
| 2,318,962 | 5/1943 | Parker . |
| 2,335,814 | 11/1943 | Stevenson .......................... 277/20 |
| 2,358,228 | 9/1944 | Hoff .................................. 251/118 |
| 2,408,799 | 10/1946 | Melichar . |
| 2,445,505 | 7/1948 | Ashton . |
| 2,551,045 | 5/1951 | Parker . |
| 2,605,080 | 7/1952 | Rea . |
| 2,634,743 | 4/1953 | Audemar . |
| 2,651,491 | 9/1953 | Ashton et al. . |
| 2,654,564 | 10/1953 | Pech . |
| 2,685,295 | 8/1954 | Tromp . |
| 2,811,979 | 11/1957 | Presnell . |
| 3,038,487 | 6/1962 | Gardner . |
| 3,454,029 | 7/1969 | Fredd .................................. 137/112 |

(List continued on next page.)

*Primary Examiner*—Michael Powell Buiz
*Assistant Examiner*—Ramesh Krishnamurthy
(74) *Attorney, Agent, or Firm*—Blackwell Sanders Peper Martin

(57) ABSTRACT

The hydraulic shuttle valve has two coaxial supply ports and a transverse function port to direct fluid coming from alternative control sources to a blow out preventor (BOP). The valve includes a moveable shuttle with opposing tapered metal sealing surfaces to alternatively engage opposing coaxial metal valve seats. The shuttle moves back and forth into alternative sealing engagement depending on which supply port has the highest fluid pressure. As the shuttle moves from engagement with one metal seat to engagement with another, there is low or no interflow from one supply port to the other, thus maximizing the amount of fluid directed to the function port. An obtuse metal point is formed on each metal valve seat which comes into contact with a respective outward tapered sealing surface on the shuttle. Repeated movement of the shuttle to and fro displaces a portion of the metal point into a recessed chamfer. This displacement of metal insures a good metal to metal seal between the shuttle and the metal valve seat. This displacement of metal is also known as "progressive coining."

In alternative embodiments, the low interflow hydraulic shuttle valve with metal to metal seals can include three or more supply ports. In the alternative embodiments, a plurality of body sections each containing at least one supply port and a shuttle valve can be stacked one upon the other to achieve a multi-supply port configuration as required by the application. In the alternative embodiments, the metal to metal seals of the shuttle and the valve seats progressively coin to insure a good seal.

8 Claims, 6 Drawing Sheets

U.S. PATENT DOCUMENTS

| | | |
|---|---|---|
| 3,529,624 | 9/1970 | Cryder et al. . |
| 3,533,430 | 10/1970 | Fredd ................................. 137/112 |
| 3,533,431 | 10/1970 | Kuenzel et al. . |
| 3,550,611 | 12/1970 | Baatrup ............................... 137/111 |
| 3,642,020 * | 2/1972 | Payne ................................. 137/112 |
| 3,726,312 * | 4/1973 | Wognum ........................... 137/596.2 |
| 4,249,557 * | 2/1981 | Habiger .............................. 137/112 |
| 4,253,481 | 3/1981 | Sarlls, Jr. . |
| 4,451,047 * | 5/1984 | Herd et al. .......................... 251/214 |
| 4,467,825 | 8/1984 | Boyd . |
| 4,832,381 * | 5/1989 | Boulton ............................. 285/351 |
| 5,893,389 * | 4/1999 | Cunningham ...................... 251/359 |

* cited by examiner

LOW INTERFLOW HYDRAULIC SHUTTLE VALVE

BACKGROUND OF THE INVENTION

A. Field of the Invention

This invention relates to valves, and more particularly to shuttle valves. The invention is an improvement upon shuttle valves of the type made and sold by applicant's assignee, Gilmore Valve Company, which is the owner of the other U.S. patents for improved shuttle valves including U.S. Pat. Nos. 3,533,431 and 4,253,481.

B. Description of the Prior Art

Shuttle valves have been used for many years to control the flow of gases as in U.S. Pat. Nos. 1,529,384 and 2,408,799. Other shuttle valves have been used to control the flow of liquids as in U.S. Pat. Nos. 1,686,310 and 1,795,386.

Shuttle valves used to control hydraulic fluid, particularly those used in underwater oil field equipment, must be designed taking into consideration working pressures, up to several thousand psi and flow rates of up to several hundred gpm. It is especially important that underwater shuttle valves used in connection with operation of subsea blowout preventers (BOPs) have a long trouble-free life because of their inaccessibility. The differential pressure on the shuttle often results in high momentum as it moves from one valve seat to another. When a shuttle contacts a valve seat, the repeated impact can break or crack the cage or cause it to be warped, and can otherwise disrupt proper valve operation.

One way to address the problem of shuttle impact is to lighten the shuttle and provide rubber cushions in the form of thick sealing elements as shown in U.S. Pat. No. 3,038,487. Yet another way of addressing shuttle impact is a hydraulic cushion as shown in U.S. Pat. No. 4,253,481 owned by applicant's assignee. The hydraulic cushion discussed above is similar to the action of a hydraulic cushioned slush pump valve as shown in U.S. Pat. Nos. 2,197,455 and 2,605,080. U.S. Pat. No. 2,654,564 discloses a metal to metal seat to take the axial load imposed on the shuttle and thereby to limit the pressure on the rubber seal ring so that the rubber is prevented from being overloaded, cut or extruded by the action of high pressure fluid.

The shuttle valve disclosed in U.S. Pat. No. 4,253,481 was sold for many years by Gilmore Valve Company for use with underwater oil field equipment. This prior art valve shuttle valve was limited to two inputs and was relatively expensive to manufacture. To overcome some of these limitations, Gilmore introduced the Mark I shuttle valve in 1997 as shown in FIG. 1 of the drawings. The Mark I relied upon two elastomeric o-rings mounted around the central flange of the shuttle to achieve a seal. The end portions of the shuttle were relatively thin and were prone to cracking because of shuttle impact. In addition, the o-rings were sometimes cut or blown off due to operational pressures and flow rates.

In order to overcome some of the limitations of the Mark I, Gilmore developed a retrofit design known as the Mark II which was introduced in 1998 as shown in FIG. 2 of the drawings. The Mark II design included an increased thickness of the end portions or cage, a decrease in hole size, larger o-rings which were stretched around the shuttle and a pair of plastic teflon bearings to center the shuttle and reduce vibration as it traveled back and forth. The Mark II eliminated many of the problems of the Mark I; however, at the highest operational flow rates, o-rings were still lost. The present invention is designed for operation at 5,000 psi; the ½ inch model is designed for an 80 gpm flow rate, the 1 inch model is designed for a 250 gpm flow rate and the 1½ inch model, is designed for a 350 gpm flow rate.

In an effort to overcome the limitations of the Mark I and Mark II, applicant has developed an improved design which is the subject of the present invention. In order to overcome some of the problems associated with elastomeric seals, the present invention has eliminated such seals and now relies upon a metal to metal seal. In addition, the shuttle of the present invention has been hardened by nitriding. The metal to metal seal of the present invention is progressively coined because of repeated contact between opposing tapered sealing surfaces surrounding a central flange on the shuttle and opposing metal valve seats.

The present invention includes alternative embodiments having a modular design that allows the components to be stacked one upon the other to receive more than two inputs. Another stackable, multi-input valve is disclosed in U.S. Pat. No. 4,467,825. This design uses a plurality of spool valve members to direct a superior fluid input signal to the outlet.

The present invention is less expensive to manufacture than prior shuttle valves sold by Gilmore Valve Company as disclosed in U.S. Pat. No. 4,253,481. Alternative embodiments of the present invention allow the shuttle valve to receive 3 or more inputs which was not possible with the shuttle valve disclosed in U.S. Pat. No. 4,253,481. In addition, the present invention overcomes the limitations of the Mark I and Mark II discussed above.

SUMMARY OF THE INVENTION

The preferred embodiment of the present invention includes two coaxial inlets or supply ports and a single transverse outlet or function port. A metal valve seat surrounds each of the coaxial opposing supply ports. An elongate shuttle is coaxial with the metal valve seats and the supply ports. The shuttle valve moves from one valve seat to the other in response to differential fluid pressure. The shuttle includes a central circumferential flange with opposing tapered sealing surfaces that alternatively engage the metal valve seats around the supply ports. Each metal valve seat has a chamfer which forms an obtuse metal point. As the shuttle moves back and forth into alternative engagement with the metal valve seats, the opposing tapered sealing surfaces strike the obtuse points and displaces a portion of the metal into each respective chamfer. This displacement occurs repeatedly as the shuttle strikes the obtuse points. This displacement of metal from the obtuse point into the chamfer insures a good metal to metal seal between the valve seats and the tapered sealing surfaces on the flange of the shuttle. This phenomena is also known as "progressive coining."

BRIEF DESCRIPTION OF THE DRAWINGS

So that the manner in which the above-identified features, advantages, and objects of the present invention are attained and can be understood in detail, a more particular description of the invention, briefly summarized above, may be had by reference to the embodiment thereof which is illustrated in the appended drawings.

It is noted, however, that the appended drawings illustrate only a typical embodiment of this invention and are therefore not to be considered limiting of its scope, for the invention may admit to other equally effective embodiments. Reference the appending drawings, wherein.

DESCRIPTION OF THE PREFERRED EMBODIMENT

Subsea wellheads are often relied upon during deep water exploration for oil and natural gas. The subsea wellhead includes a stack of BOPs. Annular BOPs are actuated on a routine basis to snub or otherwise control pressure during normal drilling operations. Other blow-out preventers, such as blind rams, pipe rams, kelly rams and shear rams will also be included in the stack on the subsea wellhead. When these types of rams are actuated, operations in the well cease in order to control pressure or some other anomaly. Blind rams, pipe rams, kelly rams and shear rams are periodically tested to make sure that they are operational.

The control pod is a capsule attached to the lower marine riser package until (LMRP) which extends from the subsea wellhead. The accumulators (tanks with air space in the tops) are mounted on the LMR. At least one shuttle valve of the present invention may be attached to each BOP on the subsea wellhead. Fluid flows from the accumulators through valves on the control pod through the shuttle valve of the present invention, to activate the BOPs.

Figure 1:
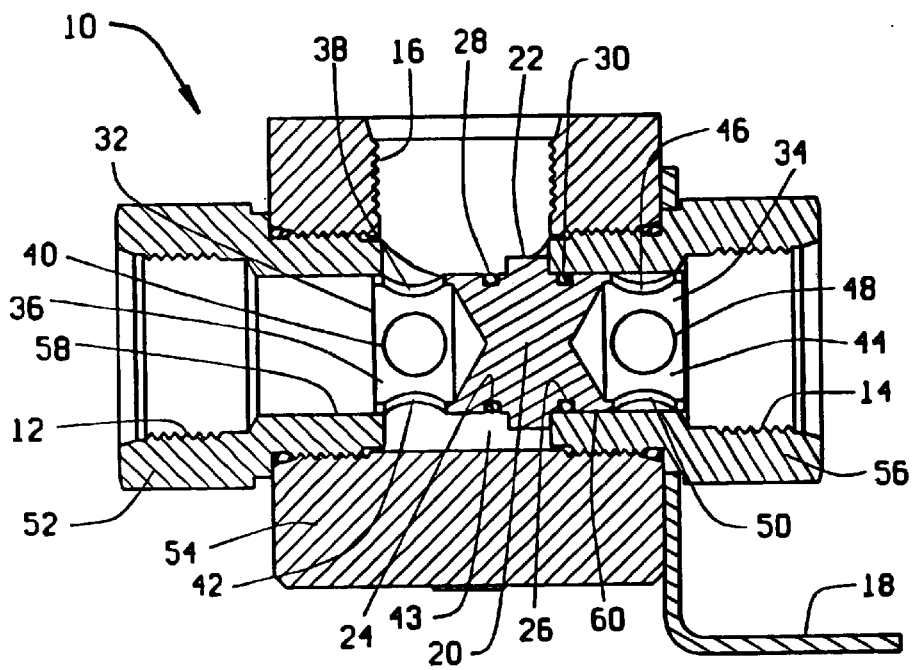
FIG. 1 is a section view of the Mark I shuttle valve, a prior art design, sold by Gilmore Valve Company.

FIG. 1 is a section view of the Mark I shuttle valve, a prior art design sold by Gilmore Valve Company. The shuttle valve 10, has a first inlet or supply port 12, a coaxial second inlet or supply port 14 and a transverse outlet or function port 16. The supply ports 12 and 14 are in fluid communication with the accumulators and the function port 16 is in fluid communication with the BOP on the subsea wellhead. The shuttle valve 10 mounts via a bracket 18 to a BOP. The shuttle 20 includes a central circumferential flange 22 which is located between a first o-ring groove 24 and a second o-ring groove 26. A first o-ring 28 is positioned in the first o-ring groove 24. A second o-ring 30 is positioned in the second o-ring groove 26.

The shuttle 20 has elongate end portions or cages 32 and 34. The first end portion 32 includes a central bore 36 which is perforated by apertures 38, 40, 42 and fourth aperture not shown in the drawing. These apertures allow fluid to flow from the first supply port 12 through the bore 36, through the apertures 38, 40 and 42 through a passageway 43 in the body 54 and out through the function port 16. The other end portion or cage 34 has a bore 44 and apertures 46, 48, 50 and a fourth aperture not shown.

The first supply port 12 is formed by an adapter 52 which threadably engages the body 54. The second supply port 14 is formed by an adapter 56 which also threadably engages the body 54. The first supply port 12 and the second supply port 14 are located on opposite sides of the body 54 and are coaxial. The adapter 52 further defines a tubular valve seat 58 which engages and seals with the o-ring 28 on the shuttle 20. The other adapter 56 likewise defines a tubular valve seat 60 which engages and seals with the o-ring 30 as shown in this figure. During operation of this prior art shuttle valve, o-rings were sometimes cut or lost and the end portions or cages were cracked due to shuttle impact.

Figure 2:
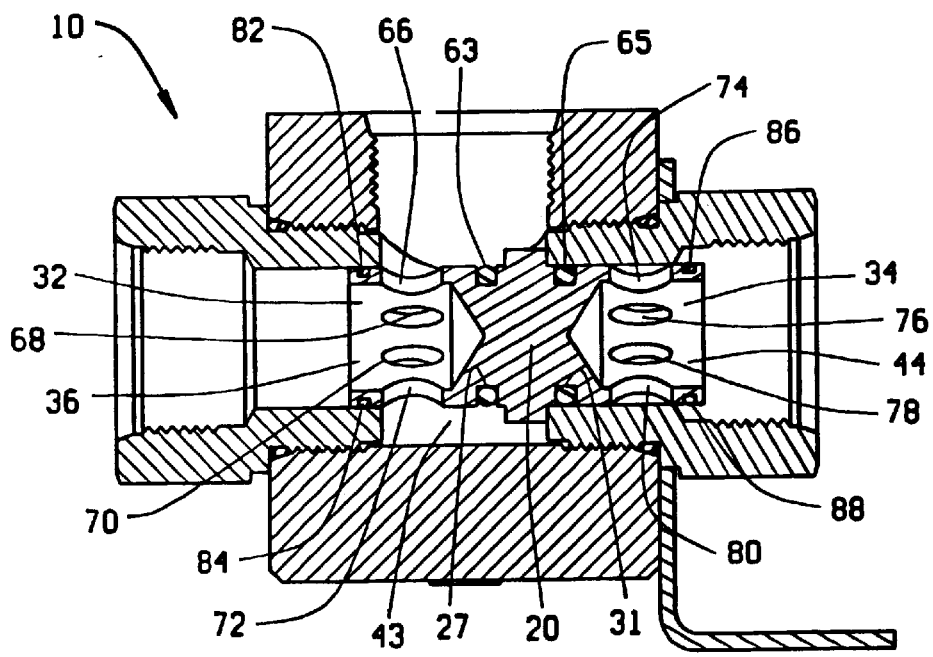
FIG. 2 is a section view of the Mark II shuttle valve, a prior art design, sold by Gilmore Valve Company.

FIG. 2 is a section view of the Mark II shuttle valve, a prior art design sold by Gilmore Valve Company. The Mark II was developed as a retrofit design to overcome some of the limitations in the Mark I. In this embodiment, the shuttle 20 was redesigned with deeper o-ring grooves 27 and 31 and larger o-rings 63 and 65. In addition, the diameter of the bores 36 and 44 was diminished, thereby thickening the wall of the end portions or cages 32 and 34. The diameter of the holes was decreased thus necessitating more holes to accommodate the same volume of fluid flow. End portion 32 was redesigned with six holes 66, 68, 70, 72 and two other holes not shown in the drawing. Likewise, end portion or cage 34 was redesigned with six holes 74, 76, 78, 80 and two other holes not shown. (The Mark I only had four holes.) In order to reduce valve impact and vibration, a circumferential channel 82 was formed in end portion 32 to receive a plastic teflon bearing 84. Likewise, a circumferential channel 86 was formed around end portion 34 to receive another plastic teflon bearing 88. These improvements in the design overcame many of the limitations of the prior art shown in FIG. 1; however, at the highest flow rates, o-rings were still being lost. Further improvements were needed.

Figure 3:
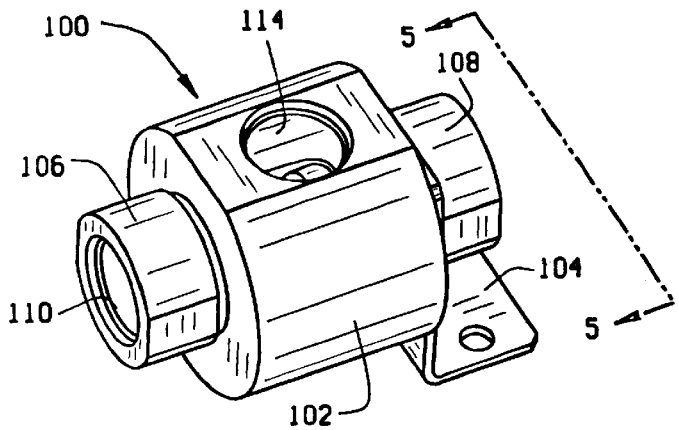
FIG. 3 is a perspective view of the low interflow hydraulic shuttle valve of the present invention with two supply ports.

FIG. 3 is a perspective view of the present invention, which is a low interflow hydraulic shuttle valve, generally identified by the numeral 100. The shuttle valve 100 includes a body 102 which is supported by a bracket 104. The valve 100 includes a first adapter 106 and a second adapter 108 coaxially aligned on opposite sides of the body 102. The first adapter 106 forms an inlet or supply port 110 and the second adapter 108 forms a second inlet or supply port 112. Each supply port 110 and 112 is connected to a separate hose or piping, not shown in the drawings. The body 102 forms a transverse outlet or function port 114. The function port 114 is connected to a hose or piping, not shown, in the drawing. Fluid enters the valve 100 either through the first supply port 110 or the second supply port 112 and exits the valve 100 through the function port 114.

Figure 4:
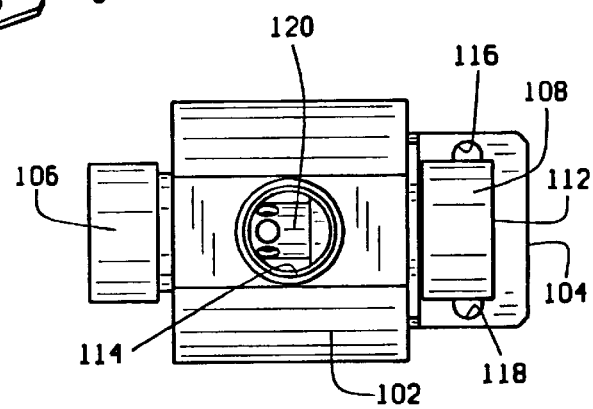
FIG. 4 is a top view of the shuttle valve shown in FIG. 3.

FIG. 4 is a top view of the valve 100 of FIG. 3. The bracket 104 includes a first aperture 116 and a second aperture 118 for mounting purposes. Looking down into the function port 114, the shuttle 120 is shown in a right-hand position shutting off any fluid flow from the second supply port 112.

Figure 5:
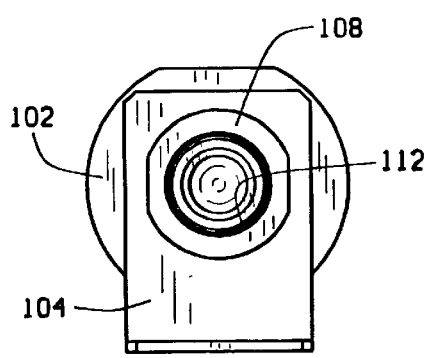
FIG. 5 is an end view of the shuttle valve of FIG. 3 along the line 5—5.

FIG. 5 is an in view of the valve 100 and the bracket 104 along the line 5—5 of FIG. 3. The second supply port 112 is formed by the second adapter 108.

Figure 6:
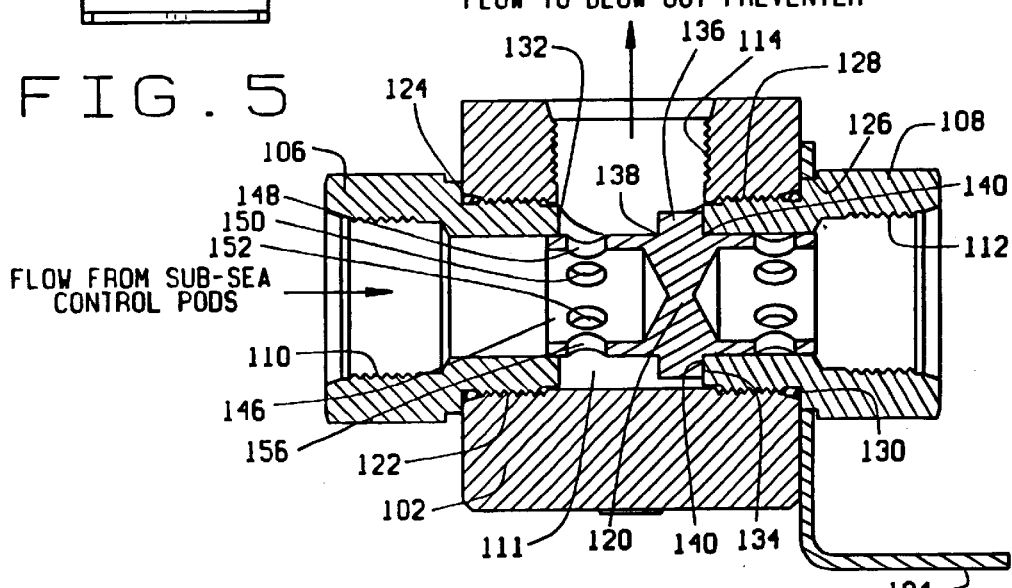
FIG. 6 is a section view of the shuttle valve of FIG. 3 with the shuttle in engagement with the valve seat of the second supply port allowing fluid flow from the first supply port to the function port.

FIG. 6 is a section view of the present invention with the shuttle 120 in the right hand position sealing off fluid flow from the second supply port 112. In this view, fluid can flow from the first supply port 110 through a passageway 111 in the body 102 and out the function port 114 as shown by the flow arrows in the drawing. The first adapter 106 threadably engages an aperture 122 in the body 102. An o-ring 124 seals the adapter 106 to the body 102. The second adapter 108 includes a recess 126 to engage the bracket 104. The second adapter 108 threadably engages an aperture 128 in the body 102. An o-ring 130 seals the adapter 108 to the body 102. The adapter 106 includes a metal valve seat 132 and the second adapter 108 includes an opposing coaxial metal valve seat 134. The shuttle 120 includes a centrally located circumferential flange 136 which has opposing tapered sealing surfaces 138 and 140. As shown in this drawing, sealing surface 140 is in sealing engagement with the metal valve seat 134 blocking any fluid flow from the second supply port 112.

The shuttle 120 is hardened by nitriding which causes the metal to darken. Applicant currently fabricates its shuttle 120 from 17-A P H Stainless Steel. After machining the shuttle 120 is nitrided by Houston Unlimited, Inc. of Houston, Tex. Other hardening processes, such as conventional heat treating may also be suitable depending on the application. Nitriding, like heat treating, is widely available from other vendors on a national basis.

Figure 7:
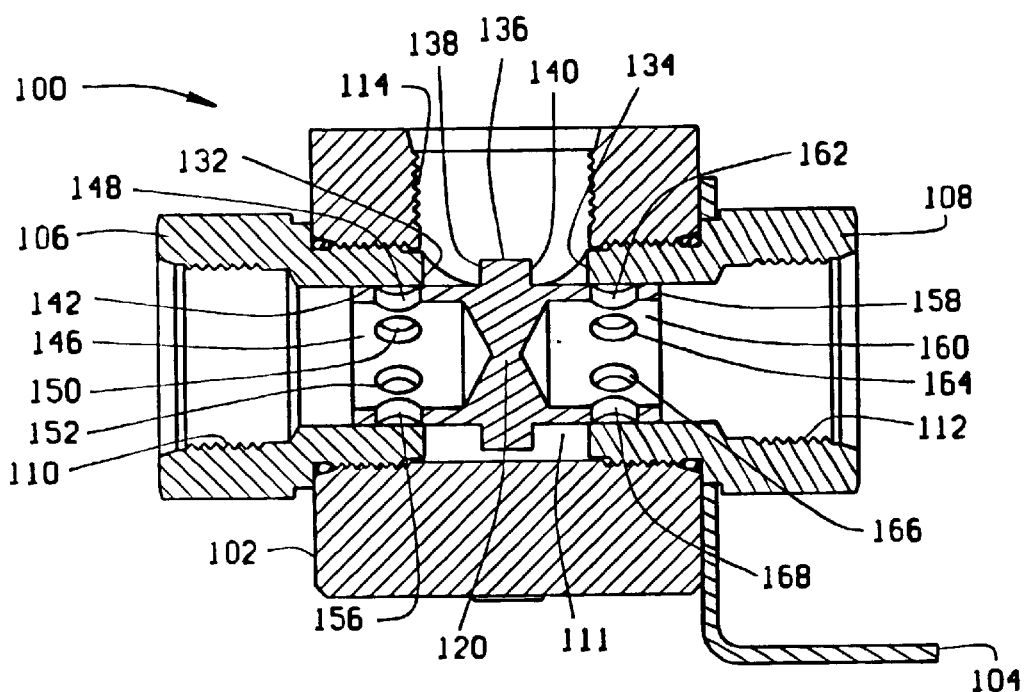
FIG. 7 is a section view of the shuttle valve of FIG. 6, except the shuttle has moved to the mid-point of travel which is a low or no flow position.
Figure 8:
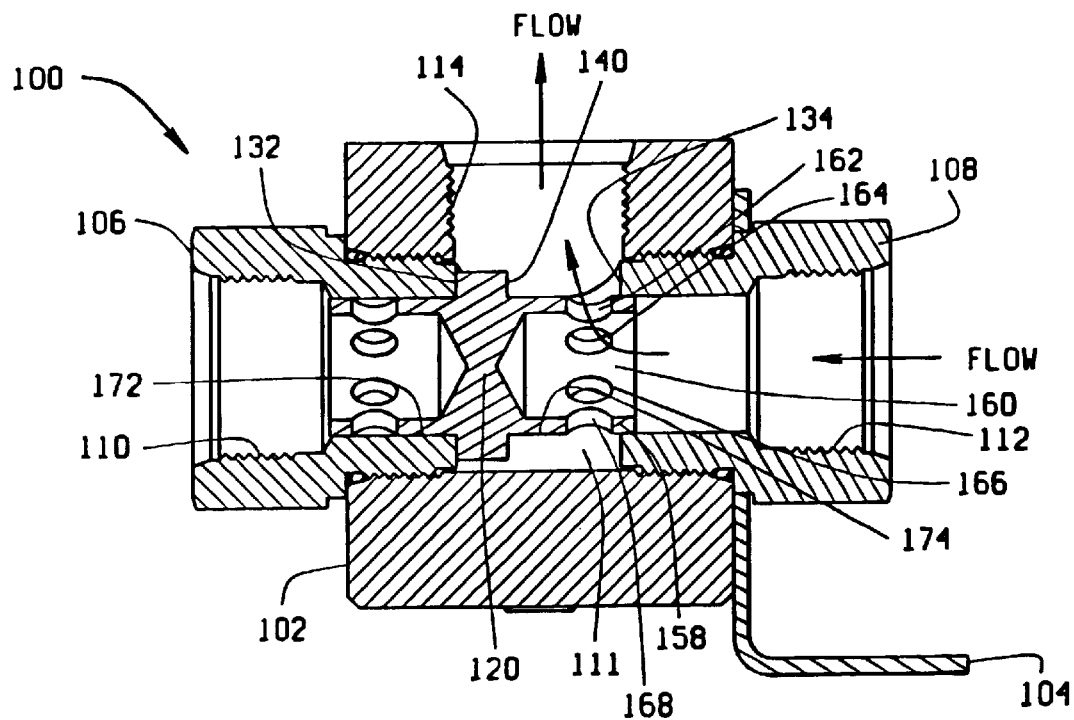
FIG. 8 is a section view of the shuttle valve of FIG. 6, except the shuttle has moved into engagement with the valve seat of the first supply port allowing fluid flow from the second supply port to the function port.

FIGS. 6, 7 and 8 show a section view of the preferred embodiment of the present invention with the shuttle 120 in three different operational positions. In FIG. 6, the shuttle 120 is shown in the right hand position in sealing engagement with the metal valve seat 134 of second supply port 112. This allows fluid to flow from the first supply port 110 through the bore 146 and apertures 148, 150, 152 and 156 through the passageway 111 of valve 100 to the function port 114. In FIG. 7 the shuttle 120 has disengaged with the valve seat 134 of the second supply port 112 and is shown at the mid point of its travel where there is little or no interflow from the first supply port 110 or the second supply port 112 into the passageway 111 or the function port 114. In FIG. 8 the shuttle 120 has moved into the left hand position in sealing engagement with the valve seat 132 of the first supply port 110. As shown by the flow arrows in FIG. 8, fluid can now pass through the second supply port 112 through the passageway 111 of valve 100 and out the function port 114 as indicated by the flow arrows in the drawing.

FIG. 7 is a section view of the shuttle valve 100 with the shuttle 120 at its mid point of travel between valve seat 134 and valve seat 132. The shuttle 120 has a first end portion or cage 142 that includes a central bore 146 and a total of six apertures 148, 150, 152, 156 and two others not shown. The other end portion or cage 158 includes a bore 160 that is coaxial with the bore 146 and a total of six apertures 162, 164, 166, 168 and two others not shown.

FIG. 8 is a section view of the shuttle valve 100 with the shuttle 120 in sealing engagement with the metal valve seat 132 so that fluid can not flow from the first supply port 110 to the function port 114. In FIG. 8, fluid flows from the second supply port 112 through the central bore 160 of the end portion or cage 158 through the apertures 162, 164, 166 and 168 into a central passageway 111 in the body 102 and out the shuttle valve 100 through the function port 114 as shown by the flow arrows in the drawing.

Due to differential pressure, the shuttle 120 will travel from the right hand position as shown in FIG. 6 to the mid-point position shown in FIG. 7 to the left hand position shown in FIG. 8. This movement of the shuttle 120 from right hand position to the left hand position, occurs quickly and creates impact forces on the shuttle 120 and the valve seats 132 and 134. Cracking of the end portions or cages was one of the problems in the prior art design shown in FIG. 1. The cracking problem has been overcome through the use of holes with a smaller diameter thus allowing more structural metal in the cage between the holes and a smaller diameter bore 146 and 160 thus allowing a thicker cage wall 172 and 174 when contrasted with the prior art design of FIG. 1. These dimensions vary with each size valve. Applicant has found that a six hole design with holes having a diameter of 0.328 inches and a cage wall thickness of 0.113 inches works well for a 1 inch valve. However, a shuttle with a different number or size of holes and a different cage wall thickness is within the scope of this invention provided that it does not result in cracks due to valve impact or otherwise damage the valve 100.

Figure 9:
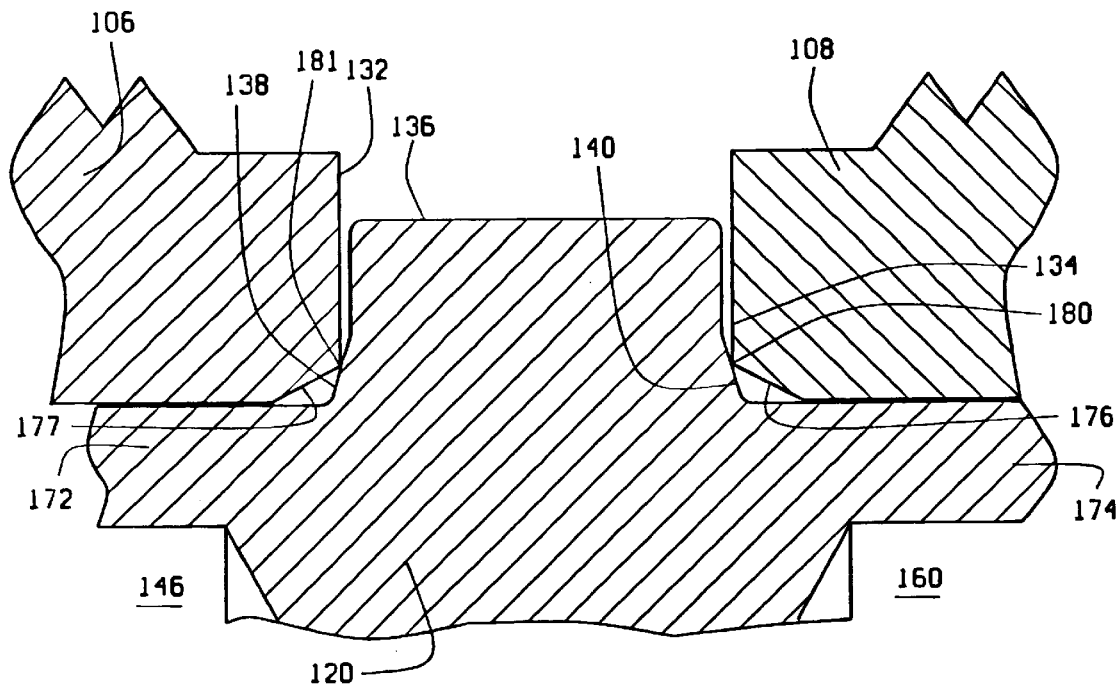
FIG. 9 is an enlarged view of a portion of the metal valve seat and a portion of the shuttle before any coining has occurred.
Figure 10:
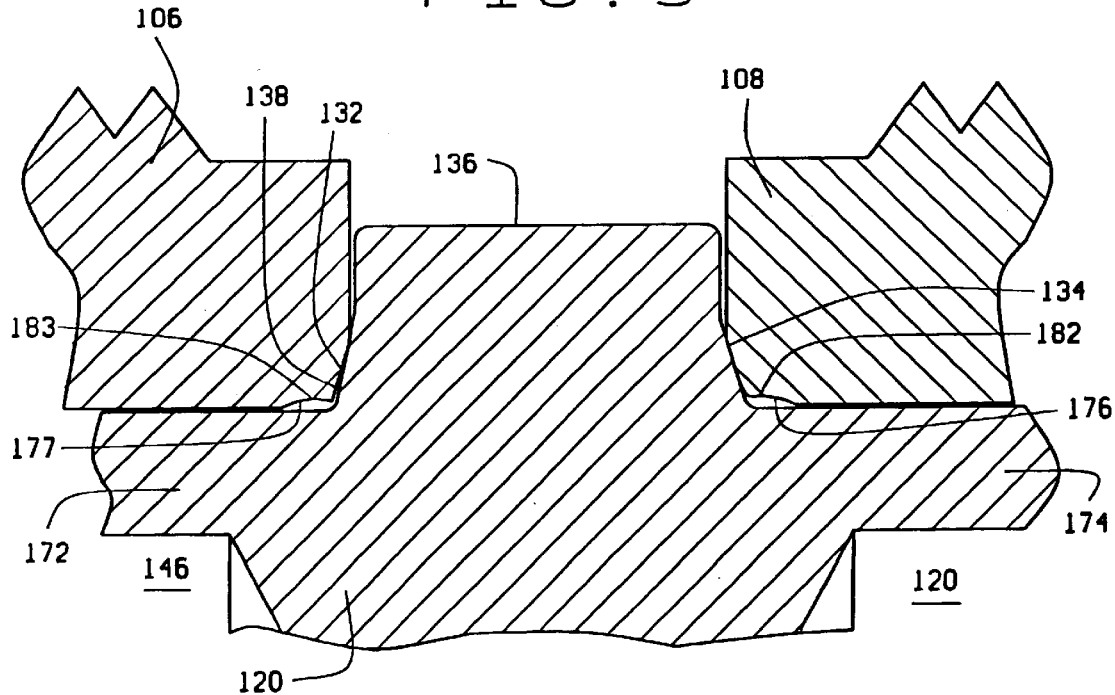
FIG. 10 is an enlarged view of a portion of the metal valve seat and a portion of the shuttle after coining has occurred and sealing engagement has been established.

FIG. 9 is an enlarged section view of a portion of the shuttle 120 and a portion of the adapter 108. FIG. 9 shows the sealing surfaces after the valve 100 has been manufactured but before any coining has occurred. FIG. 10 shows the sealing surfaces after coining has occurred. In FIG. 9 the shuttle 120 includes a circumferential external flange 136 with opposing outwardly tapered metal sealing surfaces 138 and 140. Applicant believes that a taper of approximately 8 degrees is optimum for this application. However, other tapers are within the scope of this invention so long as they will create a coining effect on the metal valve seats 132 and 134 of the adapters 106 and 108. Other tapers may be suitable for other applications possibly in the range of 5 to 15 degrees. The only requirement for the angle of taper is to achieve coining and therefore sealing with the metal valve seats 132 and 134.

The adapter 108 includes a chamfer 176 recessed behind the metal valve seat 134 to thereby create an obtuse metal point 180 that will contact the tapered metal sealing surface 140 on the flange 136 of the shuttle 120. FIG. 9 shows the metal valve seat 134 and the metal sealing surface 140 on the shuttle 120 before any coining has occurred. Applicant uses a chamfer with a 15 degree angle and a 0.0070" radius. However, the exact size and depth of the chamfer are not particularly critical because this is merely a recess or space into which displaced metal will move due to progressive coining. A stepped back shoulder or other recess would be sufficient to achieve the goals of this invention, provided that there is room to receive the displaced metal from the point 180 such that it does not interfere with movement of the shuttle 120. When adapter 106 is first manufactured it likewise has a chamfer 177 recessed behind the metal valve seat 132 to thereby create an obtuse metal point 181 that will contact the tapered metal sealing surface 138 on the flange 136 of the shuttle 120. The point 181 is progressively coined in the same fashion as the point 180 by the impact of the shuttle 120.

FIG. 10 is an enlarged section view of a portion of the shuttle 120 and a portion of the second adapter 108 after coining has occurred. As the tapered metal sealing surface 140 of the shuttle 120 impacts the point 180 of the metal valve seat 134, a portion of the metal in the point 180 is displaced into the chamfer 176. This displaced metal is identified by the numeral 182. A metal to metal seal is therefore achieved between the metal valve seat 134 and the outwardly tapered metal sealing surface 140 of the flange 136 on the shuttle 120.

Likewise, the outwardly tapered metal sealing surface 138 will impact point 181 on the metal valve seat 132 and will displace a portion of the metal 183 into the chamfer, thus creating a metal to metal seal between the metal valve seat 132 and the outwardly tapered sealing surface 138 on the flange 136 of shuttle 120.

Figure 11:
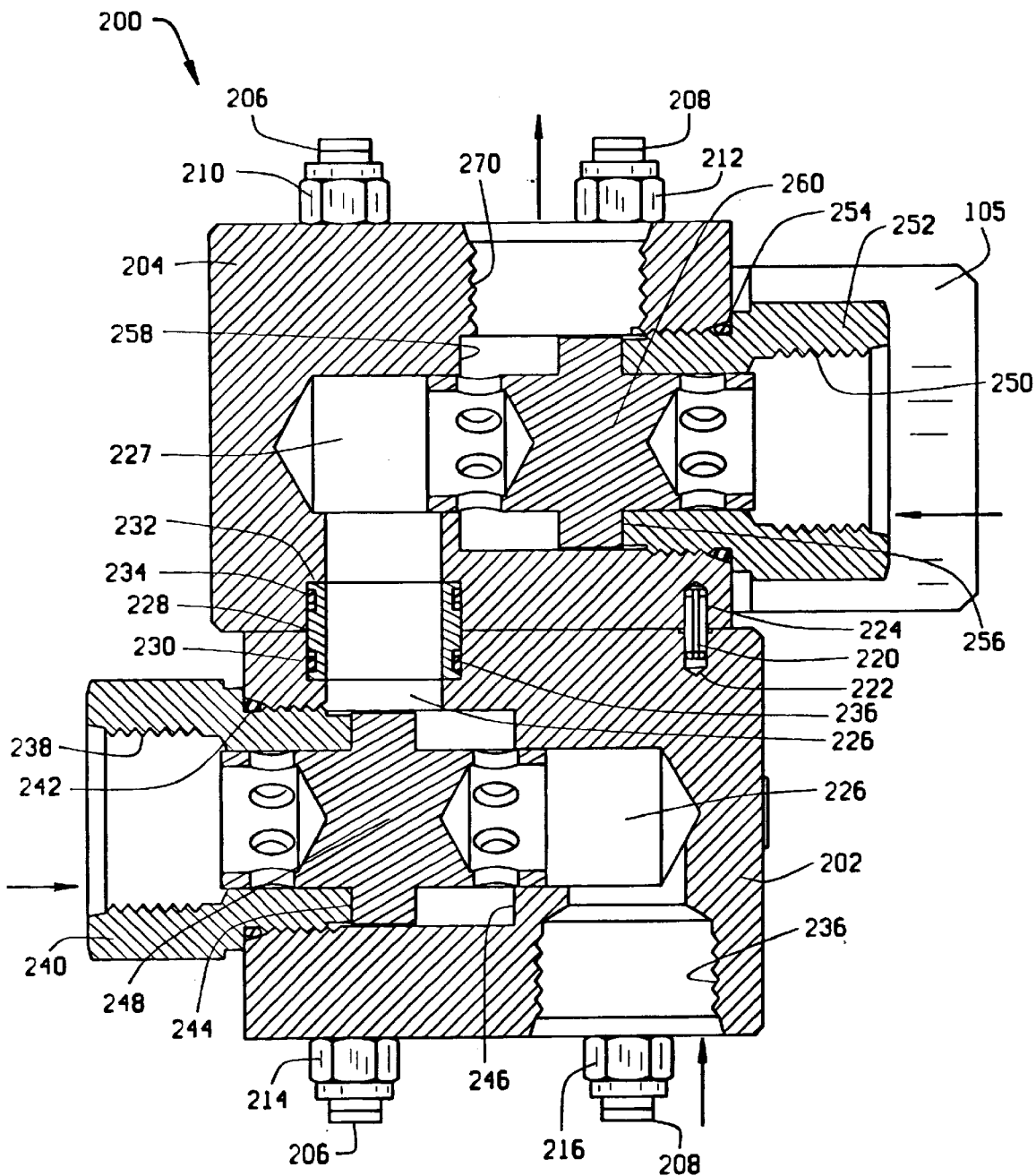
FIG. 11 is a section view of an alternative embodiment of the present invention with three supply ports.

FIG. 11 is a section view of an alternative embodiment of a low interflow hydraulic shuttle valve with three supply ports. (The embodiment in FIG. 3 has two supply ports.) The shuttle valve 200 includes a first body portion 202 and a second body portion 204 that are held together by a plurality of bolts 206 and 208 and a plurality of nuts 210, 212, 214 and 216 that mechanically grip the two body sections 202 and 204 thus joining them together into an integral assembly. An alignment pin 220 fits into a bore 222 of the body 202 and a coaxial bore 224 of the body 204. A zig-zagged interconnecting passageway 226 is formed in the body 202 and is in fluid communication with a second zig-zag passageway 227 in the body 204. A connector 228 is positioned in a bore 230 of the body 202 and another coaxial bore 232 in the body 226. The connector 228 has a first seal 234 and a second seal 236 to prevent fluid from leaking from the zig-zagged passageways 226 and 227. The connector 228 also helps align the body portions 202 and 204.

A first supply port 236 is formed in the body 202 and is in fluid communication with the passageway 226. A second supply port 238 is formed in a first adapter 240. The adapter 240 threadably engages the body 202. The adapter 240 is sealed against the body 202 by an o-ring 242. A metal valve seat 244 is formed on one end of the adapter 240. A second metal valve seat 246 is formed in the body 202 and is coaxial with valve seat 244. A shuttle 248 moves from sealing engagement with the metal valve seat 244 of the adapter 240 to alternative sealing engagement with the valve seat 246 of the body 202.

A third supply port 250 is formed in another adapter 252. The adapter 252 threadably engages the body 204 and is sealed by an o-ring 254. A mounting bracket 105 is positioned between the body 204 and the adapter 252. The adapter 252 includes a metal valve seat 256. An opposing metal valve seat 258 is formed in the body 204 and is coaxial with valve seat 244. A shuttle 260 travels back and forth into alternative sealing engagement with the metal valve seat 256 and the metal valve seat 258 depending on differential fluid pressure in the third supply port 250 and the passageway 227. A function port 270 is formed in the body 204 and connects to the BOP, not shown.

A first supply line, not shown in the drawing, connects to the first supply port 236, a second supply line, not shown in the drawing, connects to the second supply port 238 and a third supply line, not shown in the drawing, connects to the third supply port 250. If the pressure into the first supply port 236 is greater than the fluid pressure in the second supply port 238 or the third supply port 250, the shuttle 248 and the shuttle 260 will be urged into sealing engagement with the metal valve seats 244 and 256 as shown in FIG. 11. This allows fluid to flow from the first supply port 236 through the zig-zagged passageways 226 and 227 and out the function port 260 to the BOP, not shown.

If fluid pressure in the second supply port 238 is greater than fluid pressure in the first supply port or the third supply port, the shuttle 248 will unseat and move into sealing engagement with the metal valve seat 246 of the body 202. This will allow fluid to flow from the second supply port 238 through the zig-zagged passageways 226 and 227 and out the function port 270 to the BOP, not shown. If, in the alternative, fluid pressure in the third supply port 250 is greater than fluid pressure in the first supply port 236 or the second supply port 238, then the shuttle 260 will disengage from the metal valve seat 256 and engage the metal valve seat 258 of the body 204. This allows fluid to flow from the third supply port directly to the function port 270 and the BOP. The shuttle 248 progressively coins the metal valve seats 244 and 246 in similar fashion as the shuttle 120 described in FIGS. 3–10. Likewise, the shuttle 260 progressively coins the metal valve seats 256 and 258.

Figure 12:
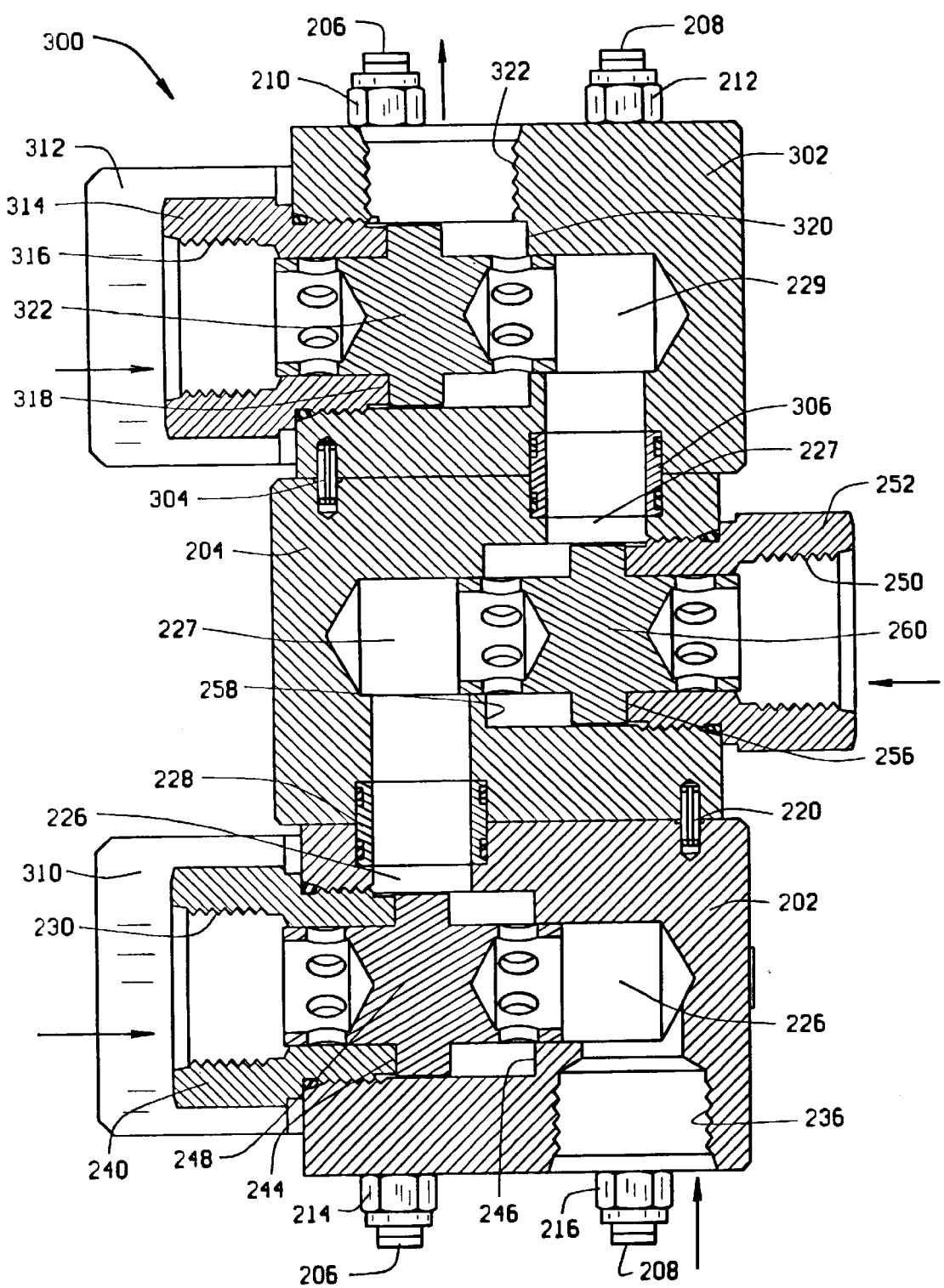
FIG. 12 is an alternative embodiment of the present invention with four supply ports.

FIG. 12 is an alternative embodiment with a four supply design for a low interflow hydraulic shuttle valve 300. The design in FIG. 12 is identical to the three supply valve 200 shown in FIG. 11 except another supply port and another body section have been added. The four supply valve 300 includes a first body section 202, a second body section 204 and a third body section 302. The body sections are aligned and connected by the first alignment pin 220 and a second alignment pin 304. Zig-zagged passageways 226, 227 and 229 are formed in the respective bodies 202, 204 and 302 and are interconnected and sealed against the bodies via a first connector 228 and a second connector 306. The second connector 306 is identical to the connector 228 shown and described in FIG. 11 except connector 228 joins body sections 202 and 204 and connector 306 joins body sections 204 and 302. The respective body sections 202, 204 and 302 are connected by a plurality of nuts 210, 212, 214 and 216 and bolts 206 and 208. The valve 300 is mounted via brackets 310 and 312 to a BOP, not shown.

The body section 202 includes a first supply port 236 and a second supply port 238 formed in the adapter 240. The adapter defines a first metal valve seat 244 and the body 202 defines a coaxial second metal valve seat 246. The shuttle 248 moves from alternative sealing engagement with the first metal valve seat 244 to the second metal valve seat 246 in response to differential fluid pressures in the first supply port 236 or the second supply port 238.

The second adapter 252 defines another metal valve seat 256 and the body portion 204 defines an opposing coaxial metal valve seat 258. The shuttle 260 moves back and forth into alternative sealing engagement with the metal valve seat 256 or the metal valve seat 258 depending on differential fluid pressures exerted upon the shuttle 260. A third adapter 314 defines a fourth supply port 316 and another metal valve seat 318. An opposing coaxial metal valve seat 320 is formed in the body section 302. A third shuttle 322 moves into alternative sealing engagement with the metal valve seat 318 of the adapter 314 or the metal valve seat 320 of the body 302 depending on differential fluid pressures.

FIG. 12 shows the valve 300 with the highest pressure in the first supply port 236 which a) urges the shuttle 248 into sealing engagement with the metal valve seat 244 of the second supply port 230, b) urges the shuttle 260 into sealing engagement with the metal valve seat 256 of the third supply port 250, and c) urges the shuttle 322 into sealing engagement with the metal valve seat 318 of the fourth supply port 316. This allows hydraulic fluid to pass from the first supply port 236 through the zig-zagged passageways 226, 227 and 229 of the body portions 202, 204 and 302 into the function port 322 and thereafter to the BOP, not shown.

In the alternative, a higher differential pressure in the second supply port 238 will cause the shuttle 248 to move into sealing engagement with the metal valve seat 246 thereby allowing fluid to pass from the second supply port 238 through the zig-zagged passageways 226, 227 and 229 to the function port 322 and into the BOP, not shown. Higher differential pressures in the third supply port 250 will likewise cause the shuttle 260 to move and engage the metal valve seat 258 and allow fluid to pass from the third supply port 250 through the passageways 226, 227 and 229 into the function port 322 and out to the BOP, not shown. If the highest fluid pressure occurs in the fourth supply port 316, the shuttle 322 will move into sealing engagement with the metal valve seat 320, thus allowing fluid to flow from the fourth supply port 316 into the function port 322 and thereafter to the BOP, not shown.

Using the modular body approach, as shown in FIGS. 11 and 12, it is possible to create low interflow hydraulic shuttle valves with as many supply ports as needed depending on the specific application.

While the foregoing is directed to the preferred embodiments of the present invention, other and further embodiments of the invention may be devised without departing from the basic scope thereof, and the scope thereof is determined by the claims which follow.

What is claimed is:

1. A low interflow hydraulic shuttle valve to direct fluid flow from two subsea control pods to a blow out preventer to actuate the preventer, comprising:

a body having a pair of opposing coaxial supply ports, and a transverse function port, the supply ports in fluid communication with the subsea control pods and the function port in fluid communication with the blow out preventer;

a first metal valve seat surrounding the first supply port and a second metal valve seat surrounding the second supply port, the valve seats being coaxially aligned on opposite sides of the body;

an elongate shuttle coaxial with the metal valve seats and the supply ports slidably moving from sealing engagement with the first valve seat to sealing engagement with the second valve seat in response to fluid flow from the subsea control pods;

said shuttle including a central flange with opposing sealing surfaces having opposing outward tapers to engage the valve seats, the shuttle further including opposing end portions, each with an axial bore and a plurality of perforations through the end portion to the bore; and each of the opposing outward tapers of the sealing surfaces on the central flange of the shuttle adapted to alternatively contact the metal valve seats to progressively coin the valve seats and ensure a metal to metal seal between the tapers and the valve seats; and a circumferential chamfer adjacent each metal valve seat to create an obtuse metal point that will contact sealing surface, a displaced metal lip protruding from the chamfer, the lip being created by the progressive coining of the seat.

2. The apparatus of claim 1 wherein the elongate shuttle consists of nitrided metal.

3. A low interflow hydraulic shuttle valve to direct fluid flow from a plurality of subsea control pods to a blow out preventer to actuate the preventer, comprising:

a body having a first supply port and a plurality of subsequent supply ports and a function port, the supply ports in fluid communication with the subsea control pods and the function port in fluid communication with the blow out preventer;

a zigzag shaped fluid passageway in the body connecting the supply ports and the function port allowing fluid to move from the subsea control pods, through the supply ports, through the fluid passageway, through the function port to the blow out preventer;

each of said subsequent supply ports having a first metal valve seat surrounding the supply port and an opposing metal valve seat surrounding a section of the passageway;

each of said subsequent supply ports having an elongate shuttle coaxial with the metal valve seat slidably moving from sealing engagement with the first valve seat to sealing engagement with the opposing valve seat in response to fluid flow from the subsea control pods;

each of said shuttles including a central flange with opposing sealing surfaces having opposing outward tapers to engage the valve seats, the shuttle further including opposing end portions, each with an axial bore and a plurality of perforations through the end portion to the bore; and each of the opposing outward tapers of the sealing surfaces on the central flange of the shuttle adapted to alternately contact the metal valve seats to progressively coin the valve seats and ensure a metal to metal seal between the tapers and the valve seats; and a circumferential chamfer adjacent each metal valve seat to create an obtuse metal point that will contact sealing surface, a displaced metal lip protruding from the chamfer, the lip being created by the progressive coining of the seat.

4. The apparatus of claim 3 wherein the elongate shuttles consist of nitrided metal.

5. A reciprocating shuttle differential fluid flow restrictor comprising:

at least one adapter having a central bore extending there through and adapted to fixedly attach inside an aperture opening to a fluid flow passageway of a fluid carrying structure forming a supply port such that fluid flows through the central bore to the fluid flow passageway; and an elongate shuttle having a central flange with opposing sealing surfaces having opposing outward tapers and having opposing end portions extending from the central flange each of said end portions having an axial bore and a plurality of apertures extending through the end portion from the exterior to the axial bore and each of said end portions adapted to slidably reciprocate in said central bore of the adapter, slidably moving one of said sealing surfaces to a metal to metal sealing engagement with a metal valve seat on said adapter to stop fluid flow through said central bore of the adapter; and a circumferential chamfer adjacent each metal valve seat to create an obtuse metal point that will contact sealing surface, a displaced metal lip protruding from the chamfer, the lip being created by the progressive coining of the seat.

6. The reciprocating shuttle differential fluid flow restrictor as recited in claim 5, where the central bore of the adapter has a circumferential chamfer adjacent the valve seat.

7. A reciprocating shuttle differential fluid flow restrictor comprising:

a pair of adapters having a central bore extending there through and adapted to fixedly attach inside an aperture opening to a fluid flow passageway of a fluid carrying structure forming first and second supply ports proximately spaced apart such that fluid flows through the pair of central bores to the fluid flow passageway; and an elongate shuttle having a central flange with opposing sealing surfaces having opposing outward tapers and having opposing end portions extending from the central flange each of said end portions having an axial bore and a plurality of apertures extending through the end portion from the exterior to the axial bore and each of said end portions adapted to slidably reciprocate in one of said central bores, slidably moving said sealing surfaces alternatively to a metal to metal sealing engagement with one of a first and second metal valve seats on said adapters, to alternatively stop fluid flow through one of said central bores of said adapters; and a circumferential chamfer adjacent each metal valve seat to create an obtuse metal point that will contact sealing surface, a displaced metal lip protruding from the chamfer, the lip being created by the progressive coining of the seat.

8. The reciprocating shuttle differential fluid flow restrictor of claim 9, wherein said pair of adapters comprises:

a first adapter member having a first central bore extending there through, said bore having a first entry port and a first exit port having a circumferential chamfer and the adapter is adapted to fixedly attach within an aperture opening to a fluid flow passageway of a fluid carrying structure where the fluid flowing through the passageway flows in said first entry port of said first central bore and out said first exit port, a second adapter member having a second central bore extending there through and said second central bore having a second entry port and a second exit port having a circumferential chamfer and said second adapter is adapted to fixedly attach within a second aperture opening to the fluid flow passageway proximately spaced apart from said first adapter disposed such that said second exit port of said second adapter faces said exit port of said first adapter where fluid flowing through the passageway flows in the second entry port and out the second exit port to the fluid flow passageway; and wherein said shuttle member comprises, an elongate shuttle member including a central circumferential flange with opposing sealing surfaces having opposing outward tapers and opposing end portions each insertable into one of the said first and second adapter bores and each of said end portion having an axial bore and a plurality of apertures extending through the end portion to the bore, where said elongate shuttle is adapted to slidably reciprocate between the first and second adapter responsive to the direction of fluid flow and the opposing sealing surfaces alternatively form a metal to metal seal with a first and second metal valve seat at the first and second exit ports and fluid flows alternatively through the first and second exit ports through the axial bore of the opposing end structures and out the plurality of apertures to the fluid flow passageway.

* * * * *